Sept. 26, 1961 E. A. WAHL 3,001,672
METHOD AND APPARATUS FOR POWDER FEEDING
Filed July 1, 1958 2 Sheets-Sheet 1
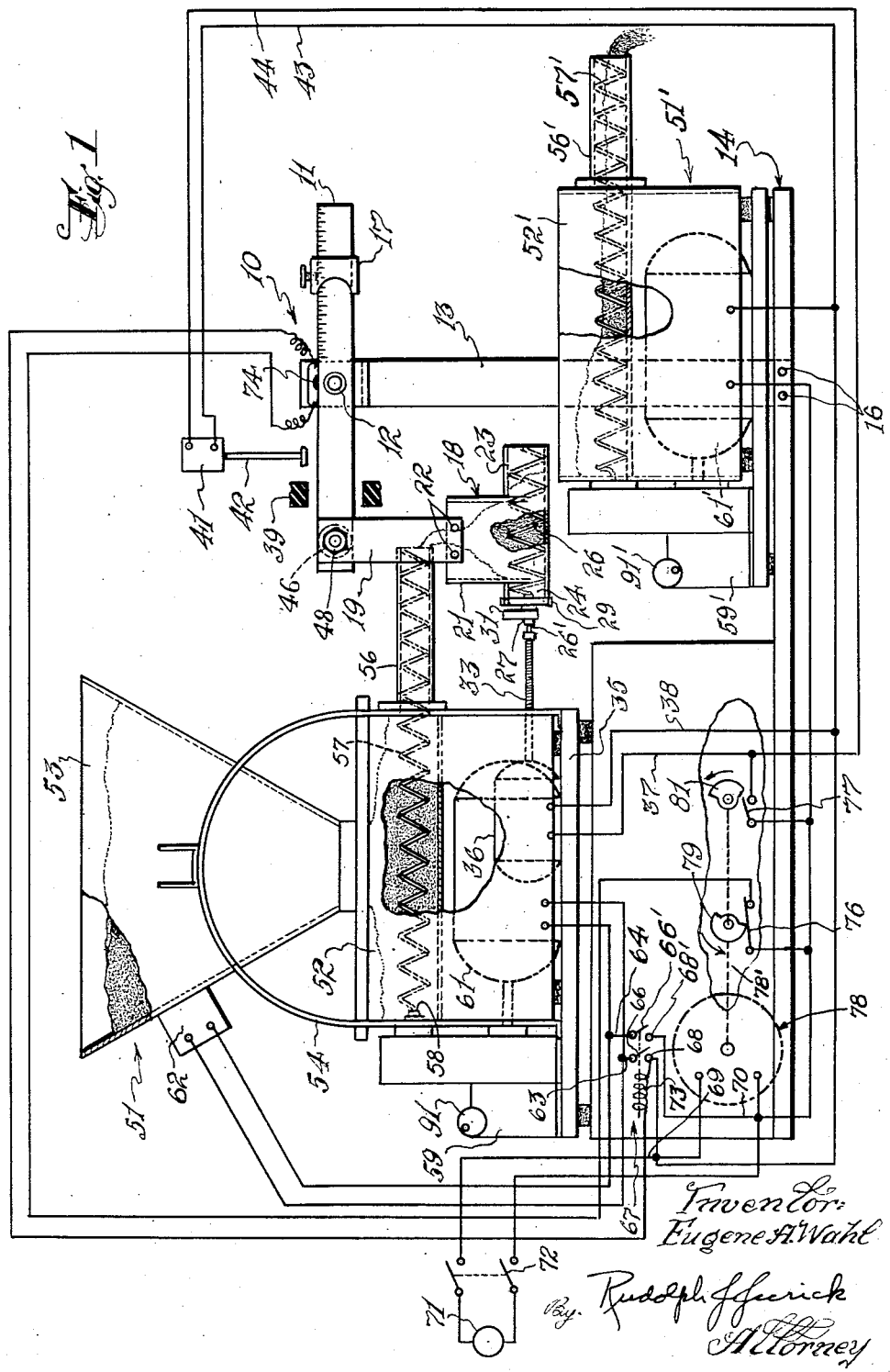

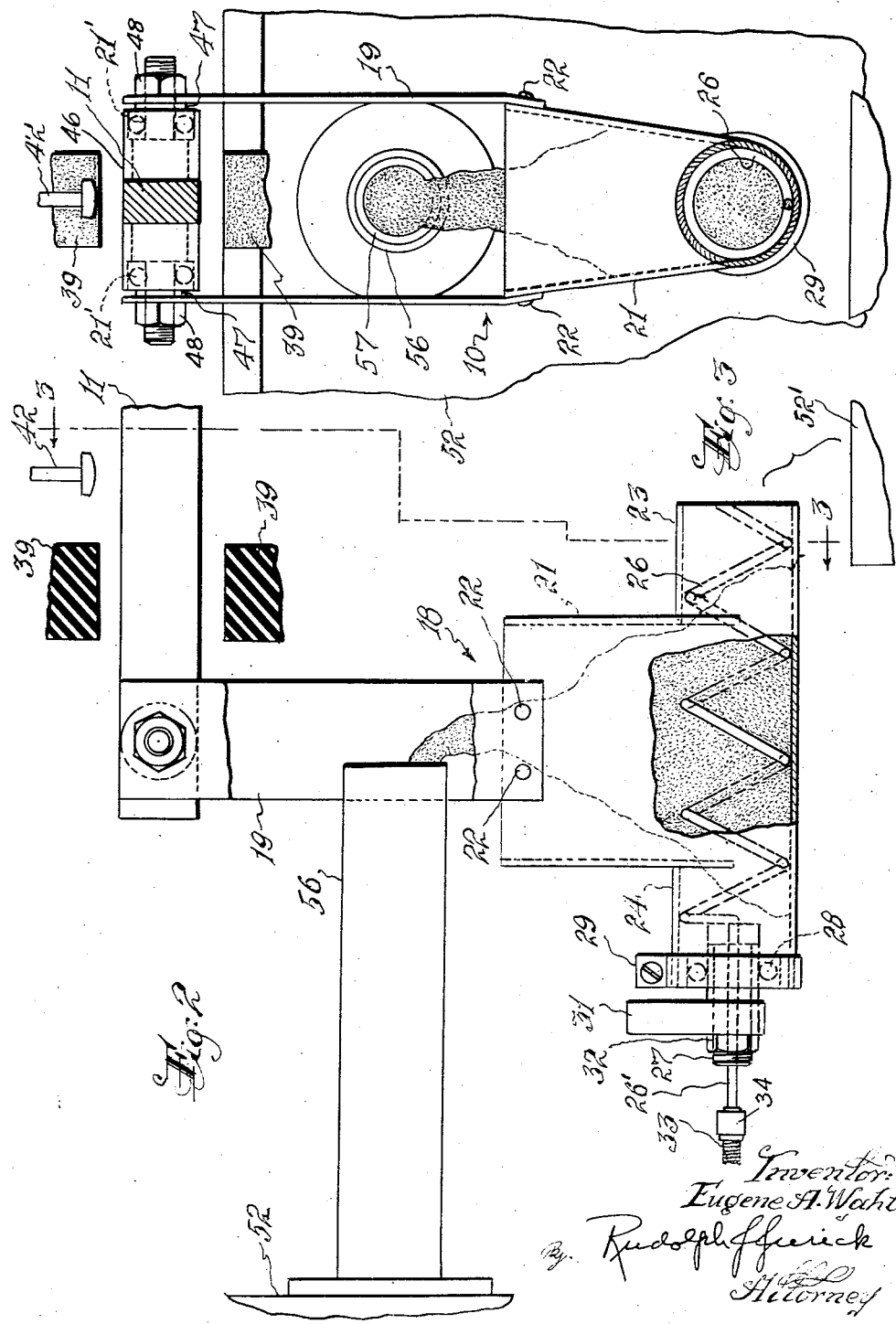

United States Patent Office 3,001,672
Patented Sept. 26, 1961

3,001,672
METHOD AND APPARATUS FOR POWDER FEEDING
Eugene A. Wahl, 294 Forest Ave., Glen Ridge, N.J.
Filed July 1, 1958, Ser. No. 746,002
9 Claims. (Cl. 222—1)

This invention relates to a method and apparatus for dispensing granular material, or the like, at a predetermined rate, and more particularly to a feeder system in which successive batches of the material are weighed out and distributed.

Dispensing devices, or systems, are employed to discharge measured amounts of powder into a medium or container as, for example, chemicals into a stream of water for purification and treatment.

The feeder system of my invention includes a gravimetric-type feeder in which successive batches of material are accurately weighed out over a predetermined time period, or weighing cycle. The weighed out batches are then distributed over a time period equal to the weighing cycle. The novel method includes periodically weighing out batches of material during a weighing cycle, and continuously distributing the weighed out batches of material in an interval of time equal to the period of a weighing cycle.

Various gravimetric powder feeder arrangements have been proposed heretofore. Such prior art methods and machines, however, are not capable of uniform, accurate, operation with powdered materials of widely different flow characteristics such as, for example, free flowing granular dry powders and sticky amorphous powders. Prior art gravimetric-type feeders are generally either of a weigh belt type, wherein material on a continuously moving belt is weighed as the belt moves over a scale, or of the "loss in weight" type. The latter type includes a hopper and feeder mechanism which is scale mounted. A scale poise is actuated along a weighing, or scale, beam, through a suitable motor driven mechanism, at a predetermined rate. The rate at which the material is fed from the hopper and feeder mechanism is regulated to maintain the scale in balance. Both the "moving belt" and the "loss in weight" types are limited in types of materials they can handle with accuracy. Free flowing materials may over-run the control element that regulates the supply to the belt, while sticky materials tend to cling to the weigh belt, or hopper and feeder mechanism.

With the feeder system of my invention, greater accuracy in weighing is obtained than in any of the prior art gravimetric-type systems, since each batch is weighed out within a given period of time. Thus, successive batches are weighed over a specific time whereby each batch, per time period, or weighing cycle, is of a predetermined weight. The accurately weighed batches are then distributed over a time interval equal to the above period of a time, or weighing cycle. Highly accurate small feed rates may be attained, since material may be fed to the scale mechanism at a low rate over a relatively long period of time, at a rate well within the sensitivity of the scale mechanism. Complete transfer of the weighed batches to the distributor feeder is insured by vigorously vibrating the weighed material in the scale mechanism during the transfer thereof to the distributor feeder.

An object of this invention is the provision of a powder feeder system of simple, rugged, design and of extreme accuracy.

An object of this invention is the provision of a method of feeding powder, granular material, or the like, with ease and great accuracy.

An object of this invention is the provision of a gravimetric-type feeder system for dispensing powder at a predetermined constant rate, and comprising means periodically weighing out a batch of material during a weighing cycle, and means continuously distributing the weighed out batch of material in a time period equal to the period of a weighing cycle.

An object of this invention is the provision of apparatus for dispensing granular material, or the like, comprising a supply feeder for feeding the material, a receptacle into which the material from the supply feeder is discharged, said receptacle having a discharge opening whereby material therein may be discharged therefrom, means sensing the weight of the material in the receptacle, control means actuated by the above sensing means when the weight reaches a predetermined amount for automatically stopping the discharge of material from the supply feeder into the said receptacle, and cyclically actuated means for discharging the predetermined amount of weighed material from the receptacle.

These and other objects and advantages will become apparent from the following description when taken with the accompanying drawings. It will be understood that the drawings are for purposes of illustration and are not to be construed as defining the scope or limits of the invention, reference being had for the latter purpose to the appended claims.

In the drawings wherein like reference characters denote like parts in the several views:

FIGURE 1 is a side view, with parts broken away, of an apparatus made in accordance with my invention, certain portions thereof being shown in schematic notation;

FIGURE 2 is an enlarged fragmentary side view of the batch weigher; and

FIGURE 3 is a sectional view taken substantially along line 3—3 of FIGURE 2.

Reference is first made to FIGURE 1 of the drawings, wherein there is shown a scale mechanism, designated generally by the reference numeral 10, and which includes a scale, or weighing, beam 11 rotatably supported on a sealed ball bearing fulcrum 12. The bearing fulcrum is suitably secured to a vertically extending post member 13 which, in turn, is secured to the base 14 of the apparatus by fastening means 16, 16. The scale mechanism forms a portion of a batch weigher for accurately weighing out successive batches of material.

A sliding weight 17 is suspended from one arm of the beam 11, while a batch weigher feeder, designated 18, which includes a bracket 19, is suspended from the other arm thereof on sealed ball bearing pivots, shown in detail in FIGURE 3. The batch weigher feeder 18, as seen in FIGURES 1 to 3 of the drawings, comprises a hopper, or receptacle, 21 attached by fastening means 22, 22 to the pivotally mounted bracket 19. Tubes 23 and 24, which communicate with the receptacle 21, are secured to the front and rear end walls, respectively, of the receptacle. An auger, or screw 26, which is shown of the wire coil type, but which may be of any suitable type, is rotatably mounted in the tubes 23 and 24, and extends through the receptacle. The free, front, end of the tube 23 is open, thereby providing a powder-discharge aperture thereat.

Referring, now, specifically to FIGURE 2, the auger 26 is provided with an end shaft 26', which is secured to a threaded shoulder bushing 27, as by soldering or any other suitable means. The bushing 27 is rotatably supported by a ball bearing 28, which is positioned in the end of the tube 24, and clamped therein by means of a clamping device 29. An eccentric weight 31 is secured to the rotatable bushing 27 between the inner race of the bearing 28 and a nut 32 attached to the threaded end thereof. The auger end shaft 26' is secured to a flexible shaft 33 by a suitable coupling device 34. As seen in FIGURE 1, the flexible shaft 33 is driven by an electric motor 36 suitably secured to a platform 35 in a supply feeder, described below. Upon energization of the motor 36, through electrical conductors 37, 38, the auger 26 is rotated, thereby discharging the material from the batch weigher feeder. The eccentric weight 31 is also rotated upon energization of the motor, thereby vibrating the entire batch weigher feeder. The wiping action of the auger 26 along the receptacle bottom and tubes, together with the vibrations produced by the eccentric weight, assure the emptying of the weighed-out material from the batch weigher feeder each cycle of operation thereof.

During the rotation of the flexible shaft 33 and auger 26, vibrating and torsional forces are transmitted to the weight beam 11 from which the batch weigher feeder is suspended. The effect of these forces is neutralized by holding the weigh beam against one of the rubber bumpers 39, 39, suitably secured adjacent the weigh beam by means not shown in the drawings. A solenoid 41, also suitably secured adjacent the weigh beam by means not shown in the drawings, is provided with a reciprocably movable arm 42, which normally terminates a spaced distance from the weigh beam. Upon energization of the solenoid, through electrical conductors 43, 44, the movable arm 42 is extended into engagement with the weigh beam, forcing the same into engagement with the lower rubber bumper 39. The solenoid 41 is energized at the same time the batch weigher feeder motor 36 is energized (in a manner described in detail below), thereby reducing the vibrational and torsional effects on the weigh beam and weighing mechanism to a minimum.

Reference is now made to the sectional view of FIGURE 3, wherein details of the suspension of the batch weigher feeder from the weigh beam 11, are shown. A cylindrical member 46 is suitably secured to the weigh arm 11 and extends from opposite sides thereof. Internal recessed ends of the cylindrical member support the ball bearings 21', 21'. One face of each of the cylindrical spacer members 47 abuts the inner race of the bearings 21', 21', while the outer washer faces abut the arms of the bracket member 19. A threaded rod extends through the cylindrical member 46, spacer members 47, bearings 21' and the bracket arms 19. Nuts 48 on the ends of the threaded rod maintain the rod and associated members on the weigh beam.

The feed system, as seen in FIGURE 1, includes a supply feeder and a distribution feeder, designated 51 and 51', respectively. The supply and distribution feeders are of substantially identical construction, the distribution feeder merely comprising a supply feeder with the hopper removed therefrom, since both feeders are of substantially identical construction, only the supply feeder 51 is described in detail below, like parts of the distribution feeder being provided with the same reference numeral, only primed. (It will here be noted that the supply and distribution feeders may be of the type described in my Patent Number 2,800,252, dated July 23, 1957, and entitled, Powder-Feeding Apparatus.)

The supply feeder 51 comprises a trough 52 with a cone-shaped hopper 53 mounted thereover on inverted U-shaped brackets 54 extending from the platform 35. A tube 56 extends outwardly of the trough 52, and an auger 57 extends through the tube and trough, which auger is shown as being of a wire coil type, but not limited thereto. The auger end shaft, designated 58, is secured to the output drive shaft of a variable speed transmission 59 through means not shown in the drawings. The transmission is driven by an electric motor 61 through a suitable coupling.

An electro-mechanical vibrator 62, of conventional construction, is attached to the hopper 53. The vibrator is connected in parallel circuit arrangement with the motor 61 whereby the vibrator and motor are energized at the same time when the electric circuit thereto is completed.

The electric circuit to the supply feeder motor 61 and vibrator 62 includes the lead wires 63 and 64, which are connected to a pair of movable contacts 66 and 66', respectively, of a relay 67. The fixed contacts 68 and 68', of the relay, are connected through lead wires 69 and 70, respectively, to a suitabl source of potential 71 through a line switch 72.

The relay coil, designated 73, is connected in series circuit, with a mercury switch 74, which switch is attached to the scale beam 11, and so disposed that the switch contacts are open when the scale is in the balanced, or over-balanced, condition. The series connected relay coil and switch are connected across the supply lines from the source of potential 71 through a series connected timer contact switch 76. It will be seen, then, that with the line switch 72 closed, the relay 67 is actuated, and the vibrator 62 energized, when the mercury and timer switches 74 and 76, respectively, are in the closed condition.

The mechanism for periodically actuating the switch 76, and a second switch 77, includes an electrical timer motor 78 connected to the supply source 71, through the line switch 72. The timer motor 78 is connected through siutable linkage 78' to a pair of cam members 79 and 81 which engage the movable contacts of the respective switches 76 and 77. It will be seen that the lead wire 44, from the solenoid 41, is connected through the switch 77 to one side of the supply source, the other lead wire 43 being directly connected to the other side of the supply source. It will here be understood that the switches 76 and 77 are of the normally open type, such switches being biased to their normally open position by any suitable biasing means not shown.

With the mercury switch 74 closed, actuation of the switch 76 to a closed position by the cam member 79, results in the energization of the supply feeder motor 61 and vibrator 62. When the timer switch 77 is closed by the cam member 81, the batch weigher feeder motor 36 and solenoid 41 are energized whereupon the feeder screw 26 is rotated and the batch weigher vibrated to empty the material therefrom into the distribution feeder 51'. The distribution feeder motor 61' is directly connected to the supply source 71 through the line switch 72 and is, therefore, continuously energized when the switch 72 is closed.

In operation, when the line switch 72 is closed, the timer motor 78 and distribution feeder motor 61' are energized. The linkage 78' from the timer motor 78 to the cam members 79 and 81 is such that the said cam members rotate at a suitable speed, which, for purposes of description only, is 4 revolutions per minute, whereby the cam members complete one revolution every 15 seconds. One weighing cycle is completed every revolution of the cams or, as illustrated, every 15 seconds. Material to be fed is supplied to the supply hopper 53 by any suitable means, not shown. As mentioned above, when the receptacle, or hopper 21 of the batch weigher feeder is empty, the contacts of the switch 74 on the scale beam 11 are closed. With the switch 74 so conditioned, when the cam 79 is rotated to the position shown wherein the switch 76 is closed, to initiate a weighing cycle, the supply feeder motor and vibrator 61 and 62, respectively, are energized, and material is fed from the supply feeder into the receptacle, or funnel, 18 of the batch weighing mechanism. When the weight of the volume of material discharged into the hopper 18 reaches a predetermined amount, as determined by the setting of the weight 17 on the arm of the beam 11 (that is, preferably, when the scale is balanced), the contacts of the switch 74 are opened, thereby stopping the supply feeder operation. The cam 79 is of a suitable configuration to permit the switch 76 to open following the opening of the switch 74, that is, after a measured amount of material has been fed into the receptacle 18. For purposes of illustration, the cam 79 shown maintains the switch 76 closed during the initial ten (10) seconds of the weighing cycle, after which time the switch 76 opens. The switch 76 is not closed again until the beginning of another weighing cycle.

At substantially the same time that the switch 76 opens, or immediately thereafter, the switch 77 is closed by the cam member 81. Upon closure of the switch 77, the weigh beam 11 is forced against the bumper 39 as the solenoid 41 is energized and the batch weigher feeder motor 36 is energized. The weighed out material in the receptacle 21 is thereby discharged into the trough 52' of the continuously running distribution feeder 51'. As mentioned above, complete discharge of the material from the batch weigher feeder is assured by the combined wiping action of the weigh screw 26 in the receptacle 21 and tubes 23 and 24, and the vibration of the batch weigher feeder by means of the rotating eccentric weight 31 included therein. The switch 77 is opened following the discharge of material from the receptacle into the distribution feeder trough. In the illustration of the invention, the switch 77 is closed at about ten (10) seconds from the start of a weighing cycle, and opens again about four (4) seconds later. One (1) second later, the switch 76 is closed, and the entire weighing cycle is repeated.

The distribution feeder 51', which is operating continuously, serves to distribute the weighed charge over a time interval equal to the time of a weighing cycle, which, in the above example, is fifteen (15) seconds. It will be noted that the weighed out material from the batch weigher feeder 18 is discharged into the distribution feeder trough adjacent the rear end thereof. The distribution feeder may carry a mound of material toward the rear thereof without appreciably raising the level of material toward the front end where metering action is principally controlled. This action serves to distribute the periodic deliveries of material from the batch weigher feeder 18 over an extended period. With a constant rate of rotation of the auger 57', the rate of discharge from the distribution feeder 51' is governed primarily by the depth of material lying within or over the auger 57' toward the forward end of the trough 52'. Within short periods, such as the length of one weigh cycle (which is fifteen (15) seconds in the illustrated embodiment), the level of material will vary only slightly. Over longer periods, such as several cycle lengths, the level of material in the distribution feeder trough will adjust itself to the rate of material delivery from the batch weigher feeder 18. From minimum level in the distribution feeder trough, to maximum level therein, this capacity for self adjustment amounts to several hundred percent. Thus, for any intermittent delivery rate from the batch weigher feeder, the material in the distribution feeder will assume a certain level, which level will be maintained within close limits, despite the periodic charges dumped to the rear of the trough. Discharge from the distribution feeder remains substantially constant from one weigh cycle to the next, and over several cycles will be almost absolutely constant. The above-mentioned self-adjusting feature inherent in the distributing feeder 51' can be explained as follows:

With a screw or auger rotating in the bottom of a valley or trough, having one end open, the screw will move material toward the open end at a variable rate, depending on the average submergence of the screw in the material. The greater the depth of material either within the screw, or overlying the screw, the greater will be the screw's capacity for moving the material out of the trough. Thus of a 1" diameter screw rotates in a trough containing only a ¼" deep bed of material, movement of this material in the direction of screw displacement occurs at a rate which is much less than if the bed of material were ½" deep, 1" deep, or 3" deep. It is an experimental fact that the 3" depth produces several hundred times the screw capacity of a ¼" depth.

Therefore, if material is piled into the rear or receiving end of a trough, it is displaced forward in direction of screw rotation rather rapidly, i.e., the excessive bed depth at the rear levels out toward the front of the trough by rotation and vibration of the screw, and vibration of the trough (in the case of the use of the feeder described in my above-mentioned Patent No. 2,800,252). Due to the considerable length of the trough, distribution of the pile lengthwise of the trough serves to increase the bed depth at the forward end of the trough only slightly. Therefore, at the forward end of the trough, where the screw's carry-off capacity is finally determined, the displacement rate by the screw of material out of the trough is effected only slightly.

If, however, substantially larger and more frequent piles are dumped into the rear of the trough, the level at the trough front will rise substantially and so will the screw's carry-off rate.

Thus, if the trough has sufficient length as well as volumetric capacity, the screw discharge rate will remain substantially constant, second to second, even though the trough receives its supply in intermittent batches. Should the size of batches or frequency of same increase, the material depth in the forward end of the trough will rise until the screw carry-off rate balances with the infeed rate into the rear of the trough.

It will here be noted that the flexible shaft connection 33, while not rotating during the weighing operation, supplies a constant reaction upon the scale 10, the effects of which reaction are either considered in the positioning of the poise 17, or preferably counterbalanced by suitable scale mechanism adjustment or construction, not shown.

In order to change the feed rate over narrow limits, the weight of the poise 17 is changed, or the poise is shifted along the scale beam, to provide a shorter, or longer, operation of the supply feeder 51. To change the feed rate of the system over wider limits, in addition to the above changes of the poise, it may be necessary to change the feed rate of the supply feeder 51 by rotation of the control handle 91 on the variable speed transmission 59, whereby more or less weight of material is delivered therefrom for charging of the weighing mechanism, within a predetermined time period. Since the capacity for self adjustment of the distribution feeder ranges within several hundred percent, as mentioned above, no adjustment of the distribution feeder operation is generally necessary with the above described changes in the feed rate of the system. If the feed rate of the system is set outside of the range of self adjustment of the distribution feeder for any given rate of rotation of the distribution screw, it will be understood that the feed rate of the distribution feeder 51' may be brought within the self adjusting range by rotation of the control handle 91' on the variable speed transmission 59', thereby changing the supply screw rate of rotation. It will be understood, then, that during operation of the system, the weighed out charge from the batch weigher feeder is distributed, by the distribution feeder 51', over a time interval equal to the period of a weighing cycle.

The supply and distribution feeders 51 and 51', respectively, as mentioned above, are preferably of the type shown in my Patent Number 2,800,252, dated July 23, 1957, and entitled, Powder-Feeding Apparatus. Since the feeder therein shown includes a novel vibrating trough and auger mechanism, the feeder system of my invention, which utilizes such feeders, is capable of handling either free flowing, or sticky substances, in powder, pellet or flake form. Typical of the items which are easily handled by the apparatus of my invention are cement, salt, alum, sulphur, titanium oxide, stearate salts, anhydrous lime, wood flour, soda ash, clays, phosphate rock, pigments, dyes, zinc oxide, copper oxide, powdered metals, gravel, gelatine, carbon black, etc.

It will here be noted that extremely accurate, and small, feed rates are possible with the feed system of my invention, since material may be accumulated over a relatively long period of time (up to ten (10) seconds, in the example described above) to easily come within the scale sensitivity. Although mercury switches 74, of the type shown in FIGURE 1 are available, which open and close contacts upon tilting of the switch a few degrees from a normal horizontal position, it will be understood that a magnetically operated switch, having a much greater sensitivity, may be attached to the scale mechanism for opening the supply feeder circuit whereby a system having better accuracy is obtained.

Having now described my invention in detail, in accordance with the requirements of the patent statutes, various other changes and modifications will suggest themselves to those skilled in this art, and it is intended that such changes and modifications shall fall within the spirit and scope of the invention as recited in the following claims.

I claim:

1. A method of dispensing granular material, or the like, comprising weighing out a batch of material into a deenergized screw-type batch weigher feeder during one portion of a weighing cycle, energizing the batch weigher feeder thereby discharging the weighed out batch into a continuously energized screw-type distributor feeder during the remaining portion of said weighing cycle, and continuously distributing the discharged weighed out batch of material from the distributor feeder in an interval of time substantially equal to the sum of said portions of the weighing cycle.

2. A method of dispensing granular material, or the like, comprising periodically weighing out batches of material into a deenergized screw-type batch weigher feeder during a plurality of consecutive weighing cycles, the weighing out in each cycle occurring during one portion of each of said cycles, periodically simultaneously energizing and vibrating the batch weigher feeder thereby periodically discharging the weighed out batch of material into a continuously energized screw-type distribution feeder during the remaining portion of each of the cycles, and continuously distributing each weighed out and discharged batch of material from the distributor feeder in an interval of time substantially equal to the sum of said portions of each of said cycles.

3. A dispensing device comprising a screw-type material supply feeder for feeding the material, a scale including a scale beam, a screw-type batch weigher feeder mounted on the scale beam into which the material from the supply feeder is discharged, means periodically initiating the feeding of the material from the supply feeder into the batch weigher feeder during one portion of each of a plurality of consecutive weighing cycles, during which the batch weigher feeder is deenergized, means controlled by movement of the said scale beam for stopping the supply of material from the material supply feeder into the batch weigher feeder, means periodically energizing and vibrating the said batch weigher feeder thereby emptying the material from the said batch weigher feeder into a continuously operating distribution feeder during the remaining portion of each of said cycles during which the supply of material from the supply feeder is stopped, the material being discharged from the distributor feeder in a time interval substantially equal to the sum of said portions of each of the said cycles.

4. Apparatus for dispensing granular material, or the like, comprising a screw-type batch weigher feeder, means periodically weighing out a batch of material in the said batch weigher feeder during a plurality of consecutive weighing cycles, the weighing out in each cycle occurring during the portion of each of said cycles during which the batch weigher feeder is deenergized, means periodically energizing the said batch weigher feeder thereby discharging the weighed out batch therefrom during the remaining portion of each of said cycles, and a continuously operating screw-type distributor feeder into which the weighed out batch is discharged, the entire weighed out batch of material being distributed from the distributor feeder over a period of time substantially equal to the sum of said portions of each of said cycles.

5. Apparatus for dispensing granular material, or the like, comprising a screw-type batch weigher feeder, means periodically weighing out a batch of material in the said batch weigher feeder during a portion of a weighing cycle during which the batch weigher feeder is deenergized, means energizing the batch weigher feeder during the remaining portion of the weighing cycle thereby discharging the weighed out material from the batch weigher feeder, a continuously operating screw-type distributor feeder into which the weighed out material is discharged, the said distributor feeder continuously distributing each weighed out batch of material in an interval of time substantially equal to the sum of said portions of said weighing cycle.

6. The invention as recited in claim 5 including means vibrating the batch weigher feeder only during the time such feeder is energized for discharging the weighed out material therefrom.

7. A method of dispensing granular material, or the like, comprising feeding the material from a supply feeder into an unenergized screw-type batch weigher feeder during one portion of a weighing cycle, sensing the weight of the material in the batch weigher feeder by a weight sensing means secured thereto, stopping the flow of material from the supply feeder into the batch weigher feeder when the weight of material therein reaches a predetermined amount, simultaneously energizing and vibrating the batch weigher feeder thereby discharging the weighed out batch of material from the batch weigher feeder into a continuously energized screw-type distributor feeder during the remaining portion of said weighing cycle during which the flow of material from the supply feeder is stopped, and distributing the batch of material from the distributor feeder over an interval of time substantially equal to the sum of said portions of the weighing cycle.

8. The invention as recited in claim 7 including rendering the weight sensing means inoperative during the discharge of the weighed out material from the said batch weigher feeder.

9. Apparatus for dispensing granular material, or the like, comprising a screw-type supply feeder for feeding the material, a screw-type batch weigher feeder into which the material from the supply feeder is discharged, said batch weigher feeder having a dischage opening formed therein through which material may be discharged upon energization of such feeder, means periodically energizing the supply feeder for feeding material into the batch weigher during a plurality of consecutive weighing cycles, the weighing out in each cycle occurring during one portion of each of said cycles, means sensing the weight of the material in the batch weigher feeder, control means actuated by such weight sensing means above a predetermined amount for automatically deenergizing the supply feeder to stop the discharge of material from the supply feeder into the batch weigher feeder whereby a weighed out batch of material is contained in the batch weigher feeder during each of said cycles, a screw-type distributor feeder, control means periodically actuated only during the time the discharge of material from the supply feeder is stopped for simultaneously energizing and vibrating the batch weigher feeder to thereby discharge the weighed out material through the discharge opening formed in the batch weigher feeder into the said distributor feeder during the remaining portion of each of said cycles, the said distributor feeder distributing the said weighed out batch of material in the time substantially equal to the sum of said portions of each of said cycles.

References Cited in the file of this patent

UNITED STATES PATENTS

| | | |
|---|---|---|
| 2,288,099 | Mason | June 30, 1942 |
| 2,800,252 | Wahl | July 23, 1957 |

FOREIGN PATENTS

| | | |
|---|---|---|
| 729,633 | Great Britain | May 11, 1955 |